INVENTOR.
William G. Rowell
BY Rines and Rines
ATTORNEYS

United States Patent Office 3,109,415
Patented Nov. 5, 1963

3,109,415
FLUID LEVEL DETECTOR AND METHOD
William G. Rowell, Quincy, Mass., assignor to Scully Signal Company, Melrose, Mass., a corporation of Massachusetts
Filed Nov. 19, 1958, Ser. No. 774,883
11 Claims. (Cl. 122—504)

The present invention relates to methods of and apparatus for detecting or sensing conditions to be monitored, and, more particularly, to monitoring a predetermined level of a medium, such as a fluid and the like, in a container.

In such apparatus as stationary and marine boiler-burners, commercial and industrial boiler-burners, refinery equipment, processing equipment, and apparatus employed in the nuclear field and the like, it is often important that an indication be given when a predetermined level of a medium, such as a fluid and the like, is reached in a container therefor. One example of this importance in the boiler-burner field is evident from the fact that faulty low-water cutoff apparatus is considered to be responsible for at least 38% of all reported boiler explosions (Power Magazine, September 1953). Such cut-off devices are well known in the art to be subject to conditions which result in their failure to indicate the occurrence of low water in a boiler, resulting in hazardous or, at the very least, uneconomic conditions. Various types of sensors to detect the level of the fluid to be monitored have been used, such as, float-actuated switches, probe-type sensors or detectors that indicate the passage of electrical current through the field between probes, viscosity devices, capacitance detectors, and other different types of detectors, as well. Unfortunately, all such devices are subject to failures known as "unsafe failures," wherein the device becomes inoperative without so indicating. When the condition that it is intended to monitor arises, the sensor or detector thus fails to provide the indication for which it is solely employed. This may result in explosions, loss of the process, and other undesirable conditions. In addition to failures of the detecting device, per se, the apparatus is also subject to failure of other associated elements in the system. As a further example, a conduit is commonly utilized wherein the detector senses the fluid in the conduit rather than directly in the container. This conduit generally has one end connected to the container at a predetermined level, which may correspond to the low level mark, and the other end of the conduit is returned to the boiler or container. In series with this conduit, there may be employed a "sight glass" to provide visual means of inspecting the fluid level in the conduit, which, it is intended to have correspond to the level in the container. It can now be readily seen that if this conduit becomes plugged, or otherwise obstructed, a false indication of fluid level in the container can be given. In fact, the indication will show that the fluid level in the container is proper when, indeed, the container may be completely empty.

Such devices for fluid-level monitoring and their applications are so well known in the art that it is felt that further explanations are unnecessary, but attention is invited to my prior U.S. Letters Patent #2,798,214, that discloses in considerable detail various types of fluid-level detectors, their usage and unsafe-failure characteristics.

Other problems in connection with fluid containers or boilers, that are not related to the operation of fluid-level sensors or detectors, are also present. One such problem resides in a stratification effect which can occur in boilers and other containers, wherein widely different temperatures occur at divergent points in the boiler or container. Another problem, well known in the art, but still existing, is that of securing fast response from devices responsive to the temperature of the fluid in the container.

It is, accordingly, an object of the present invention to provide a new and improved method of and apparatus for fluid-level detection and the like that shall not be subject to any of the above-described disadvantages and that, in addition, has proved to involve relatively simple and inexpensive apparatus.

A further object is to provide a new and improved system of the character described which involves components that are well known and have reached a high degree of reliability in and of themselves.

A still further important object of the invention is to provide means whereby all of the elements constituting the system of the invention are self-checking and arranged further to be "fail-safe." The term "fail-safe" as used in the specification and claims is intended to connote that integrity failure of any of the elements or components involved in the invention will not result in falsely energizing the indicator or other load, thereby to prevent a false indication of normal operation from being given. The load may consist of a control relay, audible or visual alarm or the like arranged to provide an indication of normal operation whenever the fluid is above a predetermined point in the fluid container. The terms "indicator" or "indication" as herein employed, moreover, are used in their broad sense to connote not only actual visual, audible or other response, but also control operation or other actuation of a broad device.

An additional feature of the invention is that it provides means whereby other problems, such as those resulting from stratification and slow response from fluid temperature controls can be successfully and efficiently overcome, as well.

These and other objects and features of the invention will become more apparent hereinafter and will be more particularly pointed out in the appended claims. The invention will now be described in connection with the accompanying drawings in which:

Figure 1:
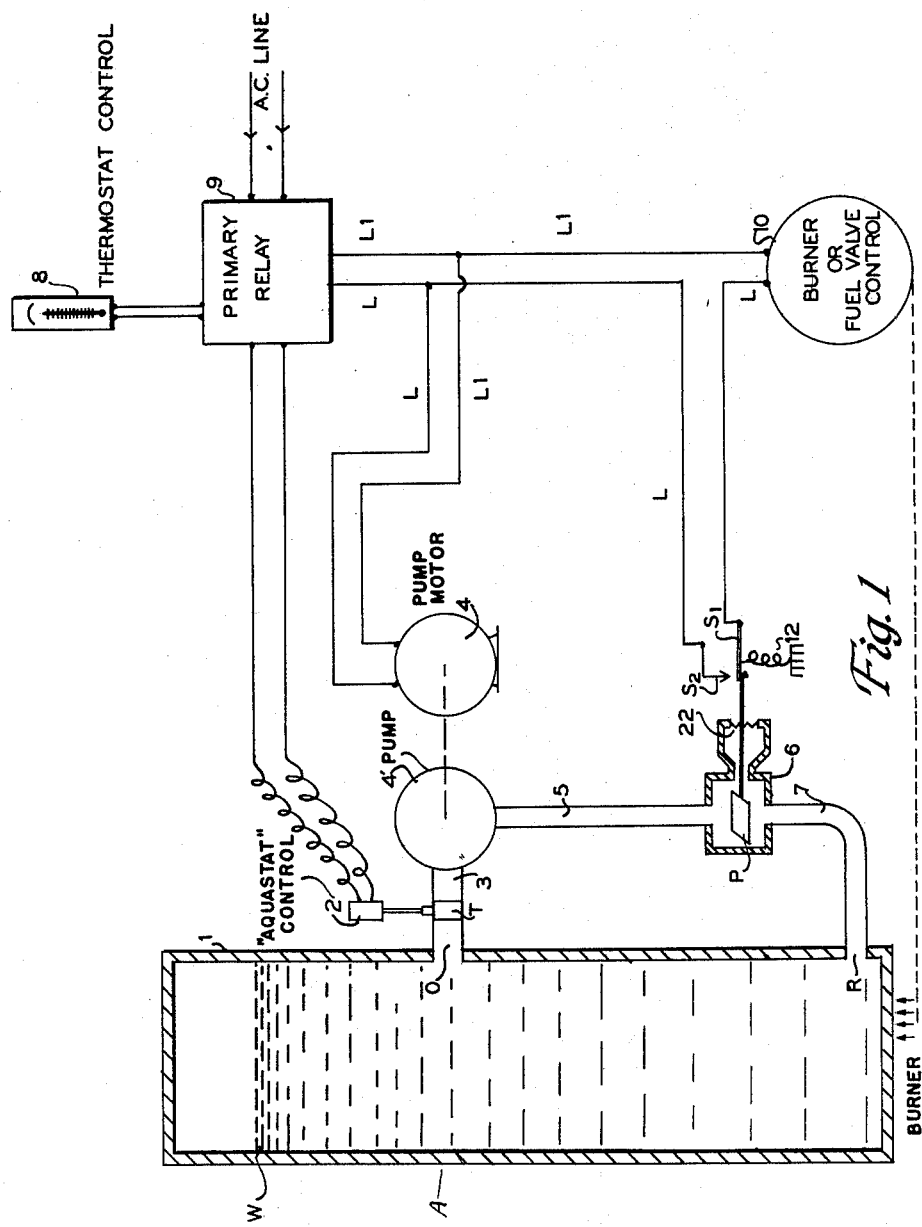
FIG. 1 is a circuit diagram of a preferred apparatus embodying the invention.

The general arrangement of the primary elements of the invention, consisting of a motor-driven pump and a switch responsive to the fluid flow created by the pump, is shown in FIG. 1. A water boiler is indicated at 1 having water indicated at level W. The predetermined low water position in the boiler is shown at level A. A burner 10 is employed to heat the water in the boiler 1 and it may be controlled by a flow switch 6 and a primary relay 9, which may be of the type of electromagnetic relays disclosed in, for example, FIGS. 1 and 2 of my said prior Letters Patent No. 2,798,214. The primary relay 9 is shown controlled by a thermostat 8 and a fluid temperature-sensitive control 2, such as an "Aquastat" control. A motor-driven pump 4—4' operated under control of the primary relay 9 through electrical conductors L and L1 is shown connected in fluid-flow series with conduits 3 and 5. The fluid-temperature control 2 is connected to a conduit fitting T, one leg of which is, in turn, connected to an opening O in the boiler 1 at approximately the level A. The other leg of the T is connected to the conduit 3. Conduit 5 is connected between the outlet side of pump 4' and the inlet sides of the flow switch 6. Conduit 7 is connected between the outlet side of the flow responsive switch 6 and a return opening R in the boiler 1 at a location relatively remotely below the point A in the boiler.

Operation of FIG. 1

When the primary relay 9 is actuated, it energizes conductors L and L1. Such actuation may be effected in well-known manner from either the thermostat 8 or the fluid-temperature control 2, whereby closure of thermostat or temperature control switch, not shown, will actuate the primary relay 9. For purposes of disclosure, a fluid-temperature control switch 2 will be referred to throughout. However, any condition responsive control, such as a pressure switch, is understood to come within the scope of this invention. When conductors L and L1 are thus energized under control of the primary relay 9, the pump motor 4 will be set into operation. The pump 4' will then be operated to cause a sample of the water in the boiler 1 to flow through conduits 3, 5, and 7. The flow switch 6, being responsive to this flow of fluid through actuation of the paddle P supported from diaphragm 22, will then close the switch contacts S1, S2, which will, in turn, connect conductor L from the primary relay 9 to the burner 10. With both conductors L and L1 energized by the action of the primary relay 9 and now connected through the flow switch 6 to the burner 10, the burner 10 will be placed in operation and supply heat to the boiler 1.

During the operating period of the burner, the motor-driven pump 4' will run and pump a continuous sample of the boiler water through the conduits 3, 5, 7 which causes the flow switch 6 to remain closed, thus maintaining the burner 10 in operation. Should the fluid level in the boiler 1 for any reason become lowered until it reaches approximately level A, however, fluid will not reach the inlet of the pump through the conduit 3, and thus will not be pumped through the conduit 5. This condition will then cause the flow-switch contacts S1, S2 to open the circuit to the burner 10, which will then cease operating. If, during a standby period, the fluid is at the low level A and a call for heat originates from either the thermostat 8 or the fluid-temperature control 2, commonly referred to as an "Aquastat," the burner will be unable to start because the flow switch contacts S1, S2 will not be closed.

Safety Features of FIG. 1

Figure 2:
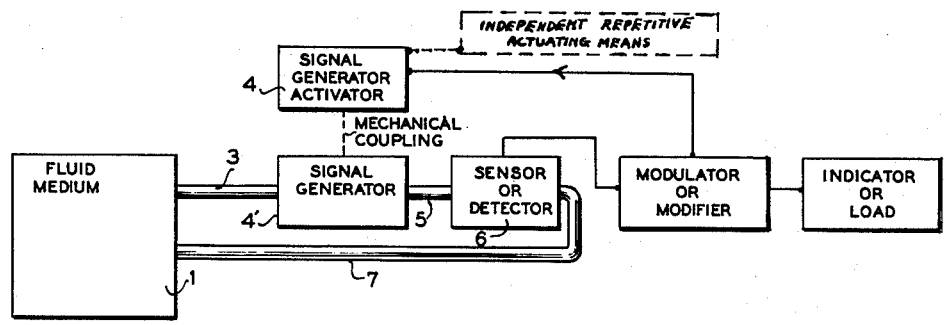
FIG. 2 is a block diagram illustrating the basic elements of the invention applied to the common burner-boiler system, which serves as an illustration of one of the important systems to which the invention may be applied.
Figure 3:
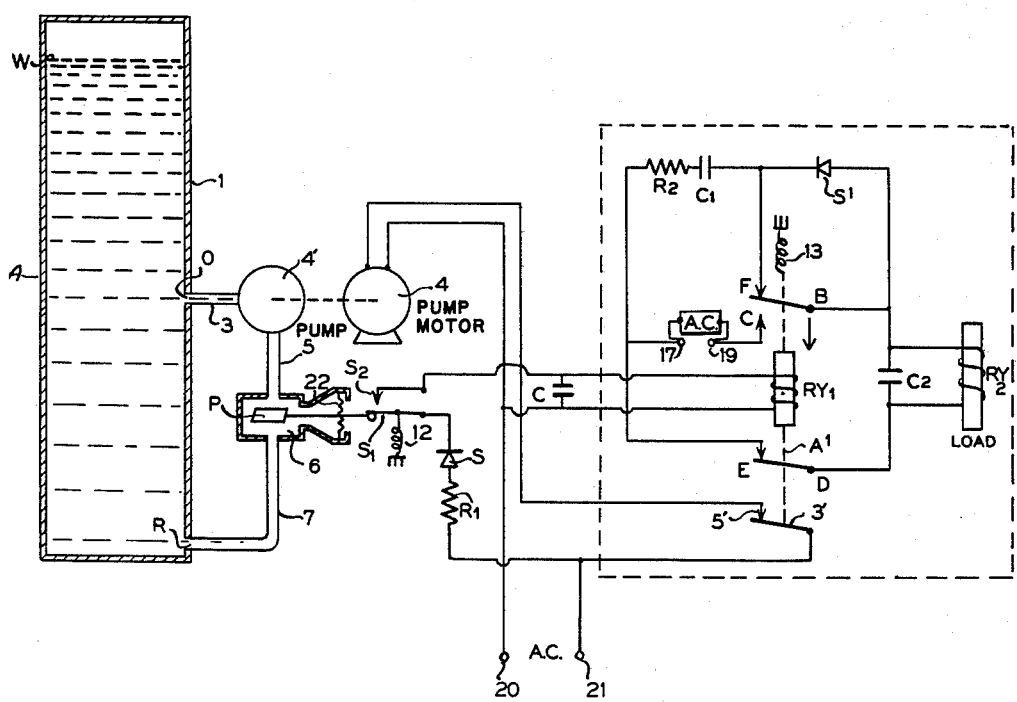
FIG. 3 is a circuit diagram of a modification illustrating a form of the system of FIG. 2.

The only element of the invention of FIG. 1 that can fail unsafe is the flow switch 6. In the embodiment of FIGS. 2 and 3, however, even this single element can be adapted to be "fail-safe." Failure of any of the other elements of the circuit in FIG. 1 will result in stopping operation of the burner 10, which results in a safe failure. Present low-water cutoff safety switches cannot detect plugging or stoppage in the conduit 7. It can be seen that, in the arrangement of this invention, any such failure in the sampling loop conduit will be detected by the flow switch 6. Also, should the pump, motor or wiring thereto fail, a safe failure will result.

Advantageous Features of FIG. 1

Faster response of the "Aquastat" or other fluid-temperature control 2 will result through use of the circuit of FIG. 1. This is due to the fact that the temperature sensing element 2 is placed in series with the pump inlet so that fluid is constantly flowing around the sensing element 2 during the periods the burner 10 is in operation. As is well known, this causes a very rapid transfer of thermal energy from the fluid to the sensing element with consequent fast action of the "Aquastat" 2, providing a most desirable result.

It can also be seen that practice of the invention will cause a rapid equalization of the fluid temperature within the boiler 1. Stratification of the fluid in boilers, which causes hot and relatively cold spots at varying locations within the boiler, can occur if the internal heat transfer passages of the boiler 1 build up with obstructions or cause turbulence, as well as for other reasons. This slows up the internal gravity circulation of the boiler 1 and can create a stratification effect in boilers. The pump of the invention will, of course, cause a forced circulation to occur within the boiler which can be beneficial in many respects. It also tends to keep the internal passages clean, since any foreign matter in suspension in the fluid is circulated throughout the boiler 1 due to the action of the pump 4'.

It should also be pointed out that, if desired, conductors L and L1 from the pump motor 4 can be connected directly to the line instead of under the control of the primary relay 9. This would then provide a continuous check on fluid level in the boiler, as well as extending the beneficial effects of the invention, as set forth above.

FIGURE 3

FIG. 3 discloses the same basic principal of the invention as shown in FIG. 1 with the modification that the one unsafe failure possibility in connection with the flow switch 6 is eliminated. This is due to the fact that the fail-safe technique disclosed in my prior United States Letters Patent 2,807,009 is employed in connection with the elements of the invention of FIG. 3. A complete description of the technique, the circuit elements involved and their functions, is fully set forth in the above reference patent.

Briefly, when the fluid level reaches approximately the low level mark A, a load, indicated as a relay RY2, will be de-energized. The sampling loop comprising conduit 3, motor-driven pump 4', conduit 5, flow switch 6 and conduit 7 is essentially the same as in FIG. 1. Within the dotted lines are the elements shown and described in FIG. 3 of my said Letters Patent 2,807,009, which are for the purpose of providing self-checking fail-safe operation. Rectifier S and its protective resistor R1 will convert A.C. line voltage from terminals 20 and 21 to a D.C. current. Power is supplied by the A.C. terminals 17, 19. Capacitor C, connected across a further relay coil RY1, provides a delay time for the release of the relay RY1.

Operation of FIGURE 3

When the system is to be placed into operation, the line terminals 20 and 21 may be energized, for example, from a source of atternating current labelled "A.C." This closes a circuit to energize the pump motor 4 from the line terminals 20 and 21 through switch 3' and its contact 5', controlled by the armature, schematically illustrated at A' of relay RY1. The armature A' is normally held in the upward position shown by spring 13.

With the pump 4' in operation, a sample of the fluid in container 1 is pumped through the sampling loop comprising conduits 3, 5 and 7. As the paddle P of the flow responsive switch 6 is moved downward by the flow in this loop, it will operate through a diaphragm 22 to actuate the switch S1 into engagement with the contact S2. This will close the input of a circuit to energize relay RY1 traced from terminal 21 through R1 and S, through the closed flow-switch contacts S1, S2, through the coil of relay RY1 and back to the other line terminal 20. As capacitor C is connected across the coil of RY1, it will store an electrical potential. RY1 relay in the output of this circuit will now become actuated.

The actuation of relay RY1 moves the armature A' downward, opening the switch 3' from contact 5' in the previously mentioned energizing circuit for the pump motor 4, which ceases to function. When the pump 4' stops, the fluid flow through the sampling loop 3, 5, 7 will also stop, causing the flow-responsive switch 6 to open contacts S1, S2, which are normally urged into an open position by spring 12 with no flow occurring.

The flow switch contacts S1, S2, upon opening, break the energizing path from the line terminals 20 and 21 to the coil of the relay RY1. The relay RY1, however, will not become de-energized at this time because of the stored energy in capacitor C, which holds the relay actuated for a predetermined period of time.

During the period of actuation of the RY1 relay, a circuit is closed which supplies energy to potential storing capacitor C1. This is traced from terminal 19 within the dotted lines, through contacts C and B of relay RY1, through the rectifier S', capacitor C1, resistor R2 and back to the other line terminal 17.

When the energy stored in capacitor C becomes sufficiently depleted, the relay RY1 will release and cause its contacts F and B, E and D, and 5' and 3' to close under the action of return spring 13. When contacts F and B, and E and D close, the load RY2 will become connected across capacitor C1 and thus will become energized thereby. Rectifier S' will also be shunted or short-circuited by closed contacts F, B. RY2 may actually be an audible alarm, visual alarm or other signaling or indicating or controlling means. The energizing of load RY2 thus provides an indication of normal operation, demonstrating that the fluid level is above the predetermined low level mark A and that the system of the invention is functioning properly.

When contacts 5' and 3' of RY1 close, the previously mentioned energizing circuit for the pump motor 4 is re-established. This will again initiate a checking cycle wherein the flow switch 6 will respond to the flow in the sampling loop 3, 5, 7 and will again close the previously described circuit to pre-energize relay RY1. Relay RY1, in actuating, will again cause the pump motor 4 to stop operation and also again cause energy to be stored in capacitor C1.

This periodic self-checking cycling will continue as long as the fluid in the container 1 remains above the low point A and as long as the system is functioning normally. During the periodic cycling, the load RY2 will remain energized because, during the periods that capacitor C1 is being recharged, capacitor C2, connected across the load RY2, will keep the load energized.

The energized load thus provides the indication that the system is functioning normally and that the container fluid level is normal. Should any component or combination of components fail in the system of FIG. 3, in any manner whatsoever, the load cannot become falsely energized. Thus, a completely fail-safe and self-checking fluid level monitoring system is provided in FIG. 3.

The technique underlying the illustrative example of FIG. 3 is of broader application, however, to many different kinds of fluids and other monitoring or sensing systems. Thus the basic elements thereof are set forth in generalized form in FIG. 2, the pump 4' being designated more generally as any signal generator for extracting a sample flow from the medium 1 in response to the operation of its activator 4. A sensor, such as the fluid-flow system 6, senses or monitors the sample flow and operates a modulator which, in FIG. 3, comprises the input switch S₁, S₂ controlling the output relay RY1. Operation of the modulator energizes the ultimate output load or other moderator and acts upon the activator 4 to terminate the operation of the signal generator 4'. This sets the checking cycle in operation, the lack of sample flow being sensed at the input 6 and acting upon the modulator to restore the operation of the activator 4, thereby periodically checking the operability of the complete system. The time delay of the relatively slow-release ultimate output load or other indicator is adjusted so that the relays remain energized so long as the repetition rate or rates of operation of the modulator continue; but, as explained in the said Letters Patent, failure of the modulator to reproduce the periodic checking signal for a period of time greater than the period of the checking signal repetition rate or rates, will result in producing an indication of failure at the load.

Shown in dotted lines in FIG. 2 is alternate means for repetitively actuating the signal generator activator 4. This may consist of timer means which periodically energizes the motor 4. When such independent means are utilized, the "feedback loop" shown in FIG. 2 is eliminated. Thus, the checking modulation may be obtained through either feedback or independent means.

The invention is obviously adapted for high as well as low-fluid-level monitoringly positioned in inlet O below the high-level stratum 1.

Further modifications will also occur to those skilled in the art and all such are considered to fall within the spirit and scope of the invention as defined in the appended claims.

What is claimed is:

1. Apparatus for detecting a predetermined level of liquid in a heating system boiler having, in combination, a burner arranged to heat the liquid in the boiler when rendered effective, a conduit having an inlet and an outlet in communication with the interior of the said boiler, the said conduit inlet being positioned so that it will be in communication with the liquid in the boiler at the said predetermined level, means adapted to positively draw liquid from the boiler at the said inlet and to circulate the boiler liquid through the said conduit from the said inlet to the said outlet and means located at said conduit between said drawing and circulating means and said outlet and responsive to the dynamic force of the liquid flow through said conduit for rendering said burner effective to heat said boiler only when said boiler liquid is circulating through said conduit, thereby indicating that the boiler liquid is at least at the predetermined level.

2. Apparatus for fail-safe monitoring of a predetermined level of fluid in a fluid container comprising in combination, a fluid container, flow producing means adapted to withdraw fluid from the container at the said predetermined level thereby to produce a flow, flow detection means responsive to the said flow and adapted to produce output signals to indicate both the presence and absence of said flow, cycling means adapted to periodically cause the said flow to be interrupted, switching means responsive to the said output signals and adapted to provide an indication that the fluid in the container is at the said predetermined level, and means for indicating failure of any component in order that such failure may not result in falsely indicating that the fluid in the container is at the said predetermined level.

3. Apparatus as claimed in claim 2 and in which the failure-indicating means comprises further switching means controlled by the said output signals and adapted repetitively to occupy alternate positions at a predetermined repetition rate or rates corresponding to the rate or rates of the periodic cycling, means for supplying alternating-current potential, means for converting alternating-current potential to direct-current potential, potential-storing means, an electric circuit operative when the switching means occupies one of its positions to connect together the supplying means, the converting means and the storing means to store direct-current potential in the storing means, a slow-response direct-current-operated load adapted to respond after the elapse of a period greater than the period or periods of the said repetition rate or rates, and a further electric circuit operative when the switching means occupies the alternate position to shunt the converting means and simultaneously to connect the potential-storing means to the load.

4. Apparatus for monitoring a fluid system and the like, having, in combination, means for periodically inducing the flow of a sample of the fluid along a predetermined path between two levels of the fluid at a predetermined rate of repetition to produce a periodic signal, an electrical system having an input and an output, means for sensing the sample flow and transmitting a corresponding periodic sensing signal from the input to the output of said electrical system, and means responsive to the absence of such sensing signal at said output after the elapse of a period greater than the period of the said repetition rate for producing an indication thereof.

5. Apparatus for monitoring a fluid system and the like, having, in combination, means for periodically inducing the flow of a sample of the fluid along a predetermined path between two levels of the fluid at a predetermined rate of repetition to produce a periodic signal, an electrical system having an input and an output means for sensing the sample flow and transmitting a corresponding periodic sensing signal from the input to the output of said electrical system, means responsive to the presence of the periodic sensing signal in the output for controlling the periodic sample-flow inducing means, and means cooperative with said controlling means and responsive to the absence of such sensing signal at said output after the elapse of a period greater than the period of the said repetition rate for producing an indication thereof.

6. Apparatus for monitoring a fluid system and the like, having, in combination, means for periodically inducing the flow of a sample of the fluid along a predetermined path at a predetermined rate of repetition to produce a periodic signal, an electrical system having an input and an output, means for sensing the sample flow and transmitting a corresponding periodic sensing signal from the input to the output of said electrical system, an output circuit comprising switching means responsive to the presence of the periodic sensing signal in said output for repetitively occupying alternate positions at the said repetition rate, means for supplying alternating-current potential, means for converting alternating-current potential into direct-current potential, potential-storing means, electric circuit means including the switching means in one of its positions to connect together the supplying means, the converting means and the storing means to store direct-current potential in the storing means, a slow-response direct-current-operated load means adapted to respond after the elapse of a period greater than the period of the said repetition rate, and a further electric circuit means including the switching means in the alternate position to shunt the converting means and simultaneously to connect the potenial-storing means to the load means.

7. A fail-safe system for monitoring a fluid system and the like and for preventing false effective energization of an electrical load through integrity failure of any of the components of the system having, in combination, means for periodically inducing the flow of a sample of the fluid along a predetermined path at a predetermined rate, means for sensing the sample flow along the said path, voltage terminals adapted to be energized with alternating-current potential, rectifier means for converting said potential to direct-current potential when energized from the said voltage terminals, capacitor means associated with the said rectifier means for storing the converted potential, switching means responsive to the sensing means for recurrently occupying different positions at a predetermined frequency corresponding to the said predetermined rate, means including said switching means in one of its positions to connect the said voltage terminals to the said rectifier means and capacitor means in order to permit the said capacitor means to store the converted potential, means including said switching means in another of its positions to shunt the said rectifier means, a slowly de-energizable load means responsive to direct-current potential only and means for energizing said load means from the said stored converted potential during recurrent periods that the rectifier means is shunted.

8. A fail-safe system for monitoring a fluid system and the like and for preventing false effective energization of an electrical load through integrity failure of any of the components of the system having, in combination, means for periodically inducing the flow of a sample of the fluid along a predetermined path at a predetermined rate, means for sensing the sample flow along the said path, voltage terminals adapted to be energized with alternating-current potential, rectifier means for converting said potential to direct-current potential when energized from the said voltage terminals, capacitor means associated with the said rectifier means for storing the converted potential, relay-controlled switching means responsive to the sensing means and having multiple positions and adapted to be recurrently operated between these positions at a predetermined frequency corresponding to the said predetermined rate, means including said switching means in one of its positions to connect the said voltage terminals to the said rectifier means and capacitor means in order to permit the said capacitor means to store the converted potential, means including said switching means in another of its positions to incapacitate the said rectifier means, a slowly de-energizable load relay means adapted to be responsive to direct-current potential only, and means for energizing said load relay means from the said stored converted potential during recurrent periods that the rectifier means is incapacitated.

9. A fail-safe monitoring method for indicating normal operation in a fluid system comprising the steps of periodically inducing a circulating flow along a predetermined path between two levels of the fluid system of a sample of the fluid to be monitored, detecting the dynamic force of the periodic flow of fluid sample past a point along the said path, converting the periodically detected fluid sample flow force into an electrical checking signal, and producing an indication only when said electrical checking singal is absent for a period of time greater than the period of the periodic fluid sample flow.

10. A method as claimed in claim 9 and in whch there is performed the further step of feeding back the electrical checking signal to control the periodic inducing of the fluid sample flow.

11. The apparatus of claim 1, further comprising condition-sensitive means in communication with the interior of said boiler for preventing said burner from being rendered effective until the occurrence of a predetermined condition in said boiler.

References Cited in the file of this patent

UNITED STATES PATENTS

| | | |
|---|---|---|
| 688,295 | Cummings | Dec. 10, 1901 |
| 1,527,932 | Sperry | Feb. 24, 1925 |
| 2,007,714 | Gauger | July 9, 1935 |
| 2,298,825 | Grant | Oct. 13, 1942 |
| 2,446,778 | Mesh | Aug. 10, 1948 |
| 2,449,538 | Ackerman | Sept. 21, 1948 |
| 2,495,086 | Anderson | Jan. 17, 1950 |
| 2,798,214 | Rowell | July 2, 1957 |
| 2,807,009 | Rowell | Sept. 17, 1957 |
| 2,849,990 | Tongret | Sept. 2, 1958 |
| 2,967,021 | Swenson et al. | Jan. 3, 1961 |
| 2,997,989 | Jones | Aug. 29, 1961 |

FOREIGN PATENTS

| | | |
|---|---|---|
| 765,389 | Great Britain | Jan. 9, 1957 |